United States Patent
Aweya et al.

(10) Patent No.: US 7,047,312 B1
(45) Date of Patent: May 16, 2006

(54) TCP RATE CONTROL WITH ADAPTIVE THRESHOLDS

(75) Inventors: James Aweya, Nepean (CA); Michel Ouellette, Rockland (CA); Delfin Y. Montuno, Kanata (CA)

(73) Assignee: Nortel Networks Limited, Montreal (CA)

( * ) Notice: Subject to any disclaimer, the term of this patent is extended or adjusted under 35 U.S.C. 154(b) by 777 days.

(21) Appl. No.: 09/739,309

(22) Filed: Dec. 18, 2000

Related U.S. Application Data (60) Provisional application No. 60/221,338, filed on Jul. 26, 2000.

(51) Int. Cl.
   *G06F 15/16* (2006.01)

(52) U.S. Cl. ...................... 709/235; 370/231

(58) Field of Classification Search ............... 709/235, 709/238, 233, 215; 370/236; 371/231
   See application file for complete search history.

(56) References Cited

U.S. PATENT DOCUMENTS

| | | | | |
|---|---|---|---|---|
| 5,764,235 A * | 6/1998 | Hunt et al. | ................. | 345/428 |
| 5,822,537 A * | 10/1998 | Katseff et al. | .............. | 709/231 |
| 5,917,822 A * | 6/1999 | Lyles et al. | ............. | 370/395.4 |
| 6,005,599 A * | 12/1999 | Asai et al. | .................. | 725/116 |
| 6,028,842 A * | 2/2000 | Chapman et al. | ........... | 370/235 |
| 6,038,216 A * | 3/2000 | Packer | ....................... | 370/231 |
| 6,084,919 A * | 7/2000 | Kleider et al. | ............. | 375/285 |
| 6,091,947 A * | 7/2000 | Sumner | ..................... | 455/413 |
| 6,185,221 B1 * | 2/2001 | Aybay | ........................ | 370/412 |
| 6,185,625 B1 * | 2/2001 | Tso et al. | .................. | 709/247 |
| 6,215,769 B1 * | 4/2001 | Ghani et al. | ................ | 370/230 |
| 6,219,713 B1 * | 4/2001 | Ruutu et al. | ................ | 709/235 |
| 6,240,463 B1 * | 5/2001 | Benmohamed et al. | ..... | 709/238 |
| 6,252,851 B1 * | 6/2001 | Siu et al. | .................... | 370/236 |
| 6,269,078 B1 * | 7/2001 | Lakshman et al. | .......... | 370/230 |
| 6,301,258 B1 * | 10/2001 | Katseff et al. | ............. | 370/412 |
| 6,356,545 B1 * | 3/2002 | Vargo et al. | ................ | 370/355 |
| 6,374,225 B1 * | 4/2002 | Hejna, Jr. | .................. | 704/270 |
| 6,445,696 B1 * | 9/2002 | Foodeei et al. | ............. | 370/356 |
| 6,469,737 B1 * | 10/2002 | Igarashi et al. | .......... | 348/211.3 |
| 6,522,730 B1 * | 2/2003 | Timm et al. | ............. | 379/93.08 |
| 6,553,568 B1 * | 4/2003 | Fijolek et al. | ............. | 725/111 |
| 6,556,578 B1 * | 4/2003 | Silberschatz et al. | ....... | 370/412 |

(Continued)

OTHER PUBLICATIONS

Satyovolu, K. Duvedi, et al. "Explicit Rate Control of TCP Applications", ATM Forum Document, ATM-Forum/98-0152R1, Feb. 1998.

(Continued)

*Primary Examiner*—Andrew Caldwell
*Assistant Examiner*—Stepahn Willett
(74) *Attorney, Agent, or Firm*—Hunton & Williams (57) ABSTRACT

The TCP receiver's advertised window (i.e., the receive buffer of a TCP connection) limits the maximum window and consequently the throughput that can be achieved by the sender. Thus, the idea behind TCP rate control is to match the offered network load to the available resources by modifying at an intermediate network device, the receiver's advertised window in TCP acknowledgments returning to the sources. In this disclosure, we propose a new TCP rate control scheme for a shared buffer where the buffer is logically organized into multiple queues. In the scheme, dynamic buffer thresholds are used to ensure efficient and fair usage of buffer memory among the queues. Conventional schemes allocate buffer space to each queue through the use of static buffer thresholds. This can result in unnecessary packet drops which leads to poor network performance since congested or heavily loaded queues cannot gain access to buffers not utilized by lightly loaded queues.

24 Claims, 6 Drawing Sheets

U.S. PATENT DOCUMENTS

| | | | |
|---|---|---|---|
| 6,580,694 B1 * | 6/2003 | Baker | 370/252 |
| 6,625,655 B1 * | 9/2003 | Goldhor et al. | 709/231 |
| 6,625,656 B1 * | 9/2003 | Goldhor et al. | 709/231 |
| 6,625,711 B1 * | 9/2003 | Raza et al. | 711/173 |
| 6,665,728 B1 * | 12/2003 | Graumann et al. | 709/232 |
| 6,665,751 B1 * | 12/2003 | Chen et al. | 710/52 |
| 6,671,292 B1 * | 12/2003 | Haartsen | 370/521 |
| 6,683,889 B1 * | 1/2004 | Shaffer et al. | 370/516 |
| 6,697,356 B1 * | 2/2004 | Kretschmer et al. | 370/352 |
| 6,724,776 B1 * | 4/2004 | Jeffries | 370/468 |
| 6,804,244 B1 * | 10/2004 | Anandakumar et al. | 370/395.21 |
| 2002/0080886 A1 * | 6/2002 | Ptasinski et al. | 375/295 |
| 2002/0089931 A1 * | 7/2002 | Takada et al. | 370/232 |
| 2002/0105932 A1 * | 8/2002 | Miya | 370/338 |
| 2002/0114285 A1 * | 8/2002 | LeBlanc | 370/252 |
| 2004/0045030 A1 * | 3/2004 | Reynolds et al. | 725/110 |
| 2004/0062201 A1 * | 4/2004 | Deshpande | 370/235 |

OTHER PUBLICATIONS

P. Narvaez, et al., "An Acknowledgment Bucket Scheme for Regulating TCP Flow Over ATM", Proc. Globecom '97, Phoenix, Arizona, 1997.

A. Rijsinghani, "Computation of the Internal Checksum via Incremental Update", IETF RFC 1624, May 1994.

V. Jacobson, et al., "Congestion Avoidance and Control", Proc. ACM SIGCOMM'88, pp. 314-329.

T. Ziegler, et al., "Congestion Avoidance With BUC (Buffer Utilization Control) Gateways and RFCN (Reverse Feedback Congestion Notification)," IPCCC'97, Scottsdale, Arizona 1997.

L. Kalampoukas, et al., "Explicit Window Adaptation: A Method to Enhance TCP Performance", Proc. IEEE INFOCOM'97, San Francisco, CA, Mar. 1997, pp. 243-251.

S. Floyd, "TCP and Explicit Congestion Notification", Computer Commun. Revv. vol. 24, No. 5, Oct. 1994, pp. 8-23.

W. Stevens, "TCP Slow Start, Congestion Avoidance, Fast Retransmit, and Fast Recovery Algorithms", IETF RFC 1002, Jan. 1997.

S. Floyd, et al., "Random Early Detection Gateways for Congestion Avoidance", IEEE/ACM Trans, Networking, vol. 1, No. 4, Aug. 1993, pp. 397-413.

B. Braden, et al., "Recommendations on Queue Management and Congestion Avoidance in the Internet", IETF RFC 2309, Apr. 1998.

A. Demers, et al., "Analysis and Simulation of a Fair Queueing Algorithm," Internetworking: Research and Experience, vol. 1, 1990, pp. 3-26.

\* cited by examiner

TCP RATE CONTROL WITH ADAPTIVE THRESHOLDS

CROSS-REFERENCE TO RELATED APPLICATIONS

This patent application claims priority based on U.S. Provisional Patent Application No. 60/221,338, filed Jul. 26, 2000, titled, "TCP RATE CONTROL WITH ADAPTIVE THRESHOLDS", which is hereby incorporated by reference herein in its entirety.

FIELD OF THE INVENTION

The present invention relates generally to data packet flow in a network and, more particularly, to a technique for controlling a transmission control protocol (TCP) rate in a network having a shared buffer.

BACKGROUND OF THE INVENTION

The primary protocol for congestion control in the Internet is TCP. The rapid growth of applications and services over the Internet has made the performance of TCP a major issue in data networking. TCP performs its own data recovery and flow control, and makes no assumption on how the network processes the data it sends. TCP congestion control as well as error recovery are implemented by a sliding window. The TCP flow control mechanism is meant to slow down the source rate when the network becomes congested, but currently, TCP has no direct way of knowing when the network is congested. It can only indirectly detect congestion by keeping track of how many packets are lost. When packets do get lost, the loss indicates that some queue in the network might have overflowed. Every time TCP detects a packet loss, it reduces its source rate to alleviate the congestion that could have caused the packet loss.

In a high-latency network environment, the window flow control mechanism of TCP may not be very effective because it relies on packet loss to signal congestion, instead of avoiding congestion and buffer overflow. The basic problem is that TCP does not communicate directly with the network elements to be given its optimal or assigned traffic rate. By the time the TCP source starts decreasing its rate because of packet loss, the network has already been overly congested. This problem exists because the design of TCP currently only considers the flow control needs of the receiver. It does not consider the flow control needs of intermediate hops in the network. Overflow in the network itself would be detected by the sender through timeouts or through acknowledgment arrival patterns. This model has problems coping with shared multi-hop networks, where the cause of packet loss is within intermediate hops in the network.

Thus, it is generally accepted that there is a limit to how much control can be accomplished by the congestion control mechanisms in the end systems. Some mechanisms are needed in the routers to complement the endpoint congestion avoidance mechanisms. As a result, network layer enhancements such as scheduling mechanisms (e.g., Fair Queuing) and packet drop policies (e.g., Random Early Detection (RED)) have been proposed which are aimed at improving fairness and throughput.

Ideally, the source should respond to congestion (in the network and at the destination) before it occurs rather than acting when it is too late. Thus, one method to make TCP sensitive to network congestion and buffer overflows is to allow network elements between a source and destination to modify the receiver's advertised window in TCP acknowledgments returning to the source. Through this the network becomes an active (and not a passive) participant in controlling congestion and buffer overflows, similar in spirit to the intelligent congestion control techniques such as RED or RED combined with Explicit Congestion Notification (ECN). Thus, the motivation for TCP rate control and similar schemes, is the need for network control policies which do not necessarily resort to packet discard as the only means for congestion control.

Most of the existing window adjustment schemes are based on heuristics and their performance under a wide range of networking conditions are not clearly understood. The drawback of one scheme (see e.g., R. Satyovolu, K. Duvedi, and S. Kaylanaraman, "Explicit Rate Control of TCP Applications", ATM Forum Document, ATM-Forum/98-0152R1, February 1998.) is that the optimal setting of the window size to be fed back to the TCP sources, requires accurate knowledge of the round-trip time (RTT) estimates. Also, such information is usually not available at network elements. Another scheme (see e.g., P. Narvaez and K-Y Siu, "An Acknowledgement Bucket Scheme for Regulating TCP Flow Over ATM", Proc. Globecom '97, Phoenix, Ariz., 1997.) entails too much per-flow state at access nodes, essentially requiring per-flow window tracking.

In view of the foregoing, it would be desirable to provide a technique for data packet flow in a network which overcomes the above-described inadequacies and shortcomings. More particularly, it would be desirable to provide a technique for controlling TCP rate in a network in an efficient and cost effective manner.

SUMMARY OF THE INVENTION

According to the present invention, a technique for controlling the transmission of data packets through a network by controlling a TCP rate in a network device having a shared buffer with shared buffer space, is provided. In one embodiment, the technique is realized by first organizing a forward data buffer in a network device into one or more queues that store at least one forward data packet. A network device's advertised window size is then calculated by implementing an integral control algorithm that uses information pertaining to the one or more queues. The network device's advertised window size is then fed back to a TCP source. A dynamic buffer threshold is also implemented to ensure efficient and fair use of the forward data buffer memory.

In accordance with other aspects of the present invention, the forward data buffer may be organized into one or more queues with one queue per service class. There can be any integer number K of such service class queues. In addition, the forward data packet may be stored according to its service class.

In accordance with still other aspects of the present invention, the network device's advertised window size may be calculated by first initializing a timer to a predetermined time interval At. A current queue size $q_i(n)$ for queue $i, i=1, 2, \ldots K$, is then sampled during the predetermined time interval $n\Delta t$, where $(n=0, 1, 2, \ldots)$ is a current time interval index or iteration counter and represents the number of time intervals $\Delta t$ since the beginning of the process of network device's advertised window calculation. A current error signal $e_i(n)$ based, at least in part, upon the current queue size $q_i(n)$, is then calculated. In some embodiments the current error signal $e_i(n)$ may be filtered according to the relation: $\hat{e}_i(n)=(1-\beta)\hat{e}_i(n-1)+\beta e_i(n)$, where $\beta(0<\beta<1)$ is a predetermined parameter and $\hat{e}_i(n)$ is the filtered current computed error signal. Next, a network device's advertised window size $W_i(n)$ for queue i may be calculated, based, at least in part, upon the current error signal $e_i(n)$ according to the equation: $W_i(n)=[W_i(n-1)+\alpha e_i(n)]_{W_{min}}^{W_{max}}$, where $\alpha$, $W_{max}$ and $W_{min}$, are predetermined parameters. In some embodiments, this calculation of the network device's advertised window size $W_i(n)$ may be calculated using the filtered current error signal $\hat{e}_i(n)$ in the equation $W_i(n)=[W_i(n-1)+\alpha\hat{e}_i(n)]_{W_{min}}^{W_{max}}$, where $\alpha$, $W_{max}$, and $W_{min}$, are predetermined parameters. Finally, the timer may be reset for the calculation to resume anew.

In accordance with still other aspect of the present invention the feedback to the TCP source may be accomplished by first updating a TCP receiver's advertised window size. In some embodiments updating a TCP receiver's advertised window size is accomplished by first identifying whether a packet is an acknowledgment (ACK) packet, and, if not, putting the non-ACK packet in a reverse data buffer. A service class i(i=1,2, . . . k) for the identified ACK packet is then determined. An advertised window size ($RW_{rec}$) and a checksum (RCHKSUM) are then read from the identified ACK packet. Then, a determination of whether the advertised window size $RW_{REC}$, is less than or equal to the calculated network device's advertised window size $W_i(n)$ is carried out. If the advertised window size $RW_{REC}$, is not less than or equal to the calculated network device's advertised window size $W_i(n)$, then an advertised window field in the identified ACK packet is set equal to the calculated network device's advertised window size $W_i(n)$ and the checksum field for the identified ACK packet is updated.

In accordance with still other aspect of the present invention a dynamic buffer threshold is implemented by first calculating a dynamic buffer threshold for the forward data buffer. In some embodiments, calculating a dynamic buffer threshold is accomplished by first initializing a timer to a predetermined time interval $\Delta s$. Then an initial dynamic buffer threshold T(n=0) is set equal to a parameter $\gamma \in (0,1]$ multiplied by a buffer size B and divided by a number of service classes K. A current queue size $q_i(n)$ is sampled during the predetermined time interval $n\Delta s$. Then a sum of the sampled current queue size is calculated according to the equation:

$$Q(n) = \sum_{i=1}^{K} q_i(n).$$

In some embodiments, the sum of the sampled current queue size Q(n) is filtered according to the relation: $\hat{Q}(n)=(1-\phi)\hat{Q}(n-1)+\phi Q(n)$, wherein $\phi(0<\phi<1)$ is a predetermined parameter and $\hat{Q}(n)$ is the filtered sum of queue sizes. Then a determination of whether the sum of the sampled current queue size is less than the shared buffer size $\gamma B$ is made. If it is, the dynamic buffer threshold is updated according to $T(n)=\min\{T(n-1)+\Delta T,\gamma B\}$, where $\Delta T$ is a step size that controls the rate at which the dynamic buffer threshold changes. If it is not, the dynamic buffer threshold is updated according to $T(n)=\max\{T(n-1)-\Delta T,T_{min}\}$, where $T_{min}$ is a predetermined minimum size for the dynamic buffer threshold. Finally, the timer may be reset for the calculation to resume anew.

The present invention will now be described in more detail with reference to exemplary embodiments thereof as shown in the appended drawings. While the present invention is described below with reference to preferred embodiments, it should be understood that the present invention is not limited thereto. Those of ordinary skill in the art having access to the teachings herein will recognize additional implementations, modifications, and embodiments, as well as other fields of use, which are within the scope of the present invention as disclosed and claimed herein, and with respect to which the present invention could be of significant utility.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENT(S)

One embodiment of the present invention enables a simple TCP rate control scheme for a shared-buffer where the buffer is organized into multiple queues (e.g., one queue per service class). In the shared-buffer, packets can be stored according to service class as a linked-list and served using any service discipline (e.g., round robin, weighted round robin, weighted fair queuing, etc.). Some embodiments of the TCP rate control scheme use an integral control algorithm to compute the optimal window size to be fed back to the TCP sources. In some embodiments, dynamic buffer thresholds are used to ensure efficient and fair usage of buffer memory among the queues. Conventional schemes allocate buffer space to each queue through the use of static buffer thresholds which can result in unnecessary packet drops and lead to poor network performance since congested or heavily loaded queues cannot gain access to buffers not utilized by lightly loaded queues.

A shared-buffer without good buffer management procedures may not perform well under overload conditions, especially in regard to fairness. The statistical sharing of the buffer memory introduces the possibility of a small group of queues hogging most of the memory, preventing packets destined for less utilized queues from gaining their fair shares of memory or even blocked completely. Conventional solutions to such problems include setting some restrictions on the amount of buffering a queue can use (i.e., each queue has a threshold for the maximum number of buffers it can access, each queue is guaranteed a minimum number of buffers, etc.).

In some embodiments of the dynamic threshold scheme described here, buffer thresholds are dynamically adjusted according to the changing traffic load. Through this congested queues are allowed to gain access to buffers not utilized by lightly loaded queues as long as their queues do not exceed their fair share of the memory. This helps to improve the overall buffer utilization while ensuring fair sharing of buffer memory among the different queues.

The TCP rate control scheme in the present invention defines the control error as the difference between a dynamic threshold or reference queue size and the actual queue size. The present invention utilizes dynamic thresholds for each queue and the window control algorithm used to compute the network advertised window size has a control gain which determines the stability and response of the system and how well the control algorithm operates in steady-state. The sampling and control intervals in the present invention are fixed to enable efficient and simple processor implementation in discrete time steps. In addition, the present invention involves filtering of the control errors (or queue sizes) which has the important benefit of allowing traffic bursts to be queued without being unnecessarily discarded. This is because congestion is detected by comparing the average queue size to a pre-determined threshold. In effect, only the average queue size is controlled, thus allowing to some extent, transient traffic bursts to be accommodated in the queue.

Figure 1:
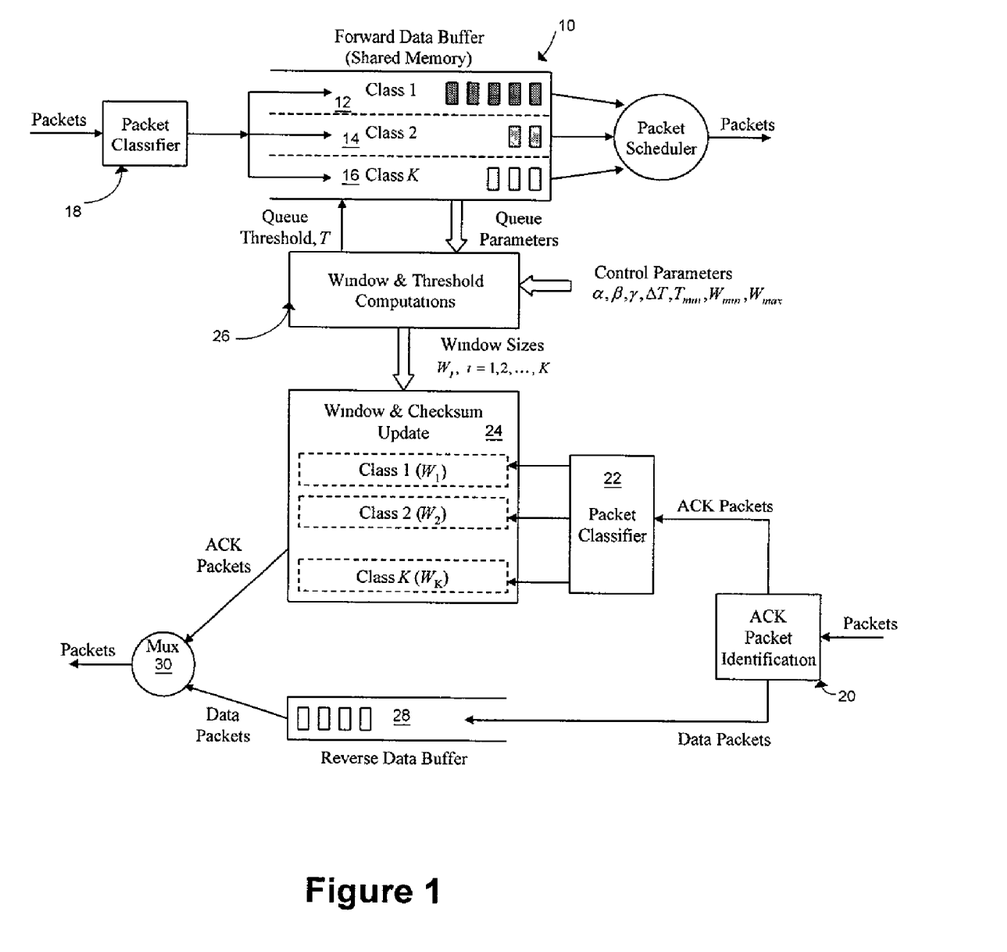
FIG. 1 is a TCP rate control scheme according to one embodiment of the present invention.

A functional block diagram illustrating the proposed TCP rate control scheme is given FIG. 1. In this embodiment, the forward data buffer 10 is organized into multiple queues. For example, buffer 10 may comprise queues 12, 14 and 16, wherein the buffer space is shared among a number of service classes (e.g., class 1, class 2, . . . , class K). For example, in a network device with a shared buffer, packets destined to a particular service class can be classified (e.g., by packet classifier 18) and stored according to service class as a linked-list in the shared buffer space.

In the reverse direction, ACK packet identification is implemented via ACK packet identifier 20, so that ACK packets can be separated from normal (non-ACK) data traffic. To identify an ACK packet, the network device checks the ACK bit in the TCP packet header to determine if the ACK bit is set. An ACK packet has its ACK bit set by the TCP receiver. ACK information might also be contained (piggybacked) in a data packet transmitted from a TCP receiver to a sender. ACK packet classifier 22 filters and separates ACK packets according to their individual classes (e.g., class 1, class 2, . . . , class K) so that their receivers' advertised windows and checksums can be updated, (e.g., at window and checksums update module 24). Also, in the reverse direction, ACK first scheduling can be used to give priority to ACK packets over reverse data packets since the number of ACK packets is normally small compared to data packets.

A wide range of traffic classes can be supported depending on the implementation complexity allowed. The criteria for classifying or filtering the ACK traffic flows can be based on source/destination Internet Protocol (IP) addresses, TCP port numbers, the Type of Service (TOS) field (or DS field), and any higher level IP packet attributes.

The architecture illustrated in the embodiment shown FIG. 1 implements the following computational functions:
(1) A window and threshold computations module 26 for
    computing the optimal window size per connection in
    each service class queue at the network device (i.e., the
    network device's advertised window size) and the buffer
    thresholds for the forward data buffer.
(2) A window and checksum update module 24 for updating
    the TCP receiver's advertised window size and checksum
    in each returning ACK packet in each service class.

Each module is described in more detail below.

The window control method of some embodiments is a mechanism for congestion control (e.g., controlling the queue size) at a line interface of a network device. The method controls congestion by modifying at an intermediate network element, the receiver's advertised window in TCP acknowledgments returning to the sources. A critical parameter in the window control scheme is determining the optimal network device's advertised window size per connection. The network device's window size represents the maximum number of packets that a TCP connection can have in transit (i.e., unacknowledged by a receiver) at a time. In determining the network device's window size per connection, one embodiment of the TCP rate control scheme tries to match the sum of the windows of all the active TCP connections sharing the network node to the network bandwidth-delay product plus the available buffering space, thus avoiding packet losses whenever possible. The method takes its decision of modifying the receiver's advertised window of an incoming ACK packet so that the queue occupancy level is kept at a given target level, thereby eliminating buffer underflow and overflow as much as possible.

For the multiple TCP connections that share a common service class queue, the window control method attempts to match the aggregate window sizes of all active TCP flows to the bandwidth-delay product plus the available buffering space at the queue while at the same time providing all the connections in the queue with similar feedback to achieve fairness in window size allocation. The feedback may be carried by returning TCP acknowledgments in the receiver's advertised window field. If the current value in the receiver's advertised window field, which is set by the destination system, exceeds the feedback value computed in the network device, the receiver's advertised window may be marked down to the feedback value. The computed feedback value may provide an upper bound for the TCP congestion window maintained at the source in order to limit packet losses in the network device.

In some embodiments, the forward data buffer 10 (e.g., a shared memory) has a capacity of B packets shared by the K service classes. The queue (e.g. 12, 14, 16) size in the network device (e.g., switch or router) is assumed to be sampled every $\Delta t$ units of time (e.g., seconds), and the window control method provides every $\Delta t$ units of time, a new value of the network device's advertised window size per connection $W_i$ for service class i (i=1,2, . . . ,K). Therefore, $\Delta t$ is the sampling/control interval of the system. The control system according to some embodiments of the invention may be described in discrete units of time as follows.

Let $q_i(n)$ denote the actual queue size of class i, i=1,2, . . . ,K, at discrete time n, where n=1$\Delta t$, 2$\Delta t$, 3$\Delta t$, . . . , and let T denote the target buffer occupancy per service class at the network device. Next, determine a window size $W_i$ which will drive the queue size of class i, to this target buffer occupancy. Then, adapt $W_i$ to react to the actual queue dynamics experienced at the network device using a simple control mechanism. For example, if the actual queue size $q_i$ is smaller than the target queue size $T_i$ $W_i$ is increased to make aggressive usage of the available resources, and vice versa if the actual queue size is high. The goal of the controller is therefore to adapt $W_i$ so that the magnitude of the error signal $$e_i(n)=T-q_i(n), i=1,2,\ldots,K,$$

is kept as small as possible.

Figures 2, 3:
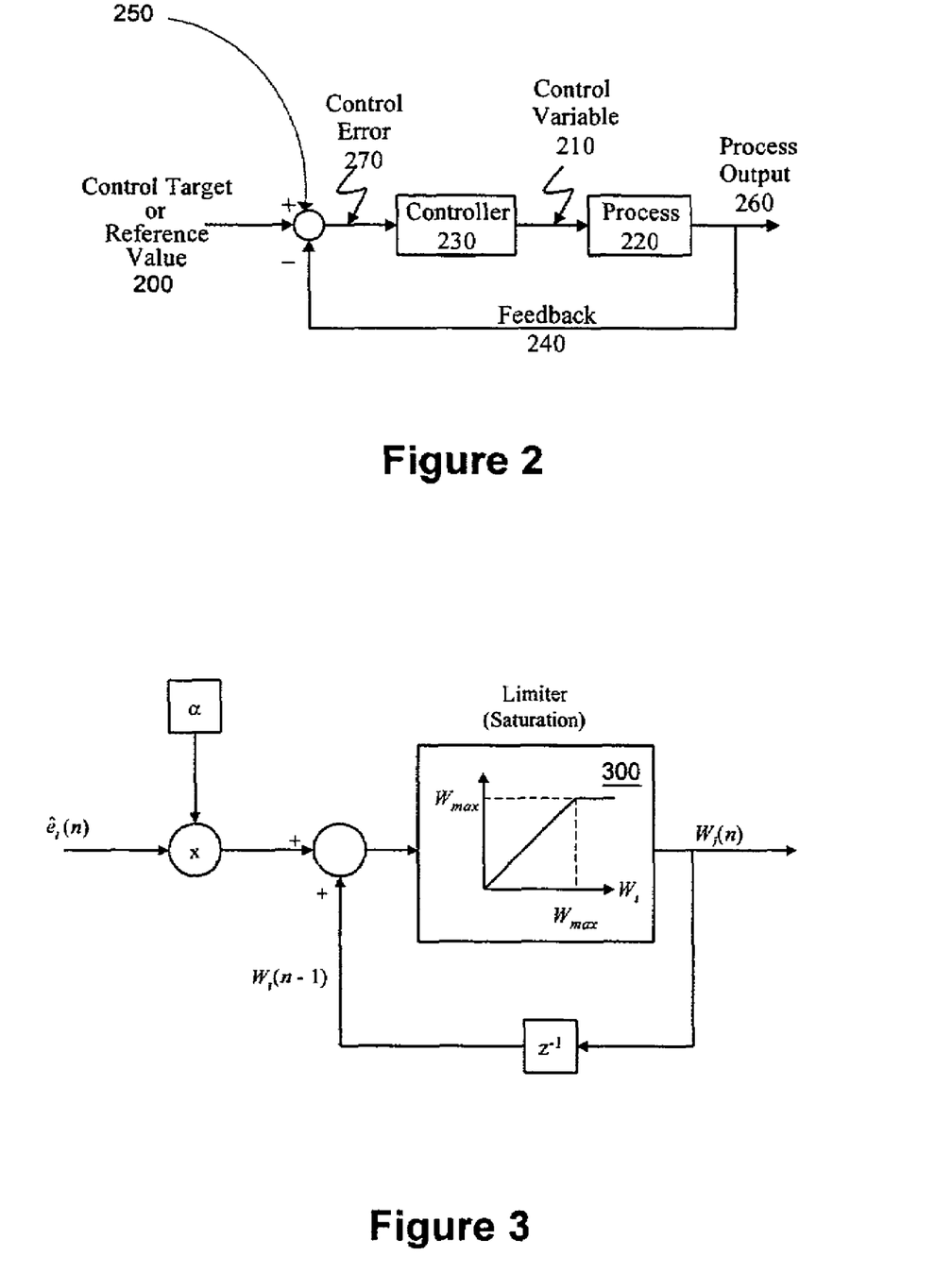
FIG. 2 is a block diagram of a feedback system according to one embodiment of the invention.
FIG. 3 is a block diagram of a feedback system providing anti-windup in a controller according to one embodiment of the invention.

In some embodiments a control theoretic approach may be implemented as is explained using the simple feedback control loop shown in FIG. 2. Generally, such a system in the TCP rate control context will consist of: a control target or reference level 200 (this corresponds to a target buffer occupancy at the network device); an output or controlled variable 260 (this corresponds to the actual queue size at the network device); a process or plant 220 (this is the process or device(s) which produces the output and corresponds to all the TCP data sources and the network devices that receive and process the data); a controller or decision-making device 230 (this is where adjustments to be made in the level of process or plant operation are calculated or are decided upon and corresponds to the module which computes the TCP window size to be communicated to the sources); a feedback device 240 (this is the device which measures some feature of the output and processes the information in preparation for comparison with the control target); and a comparator or detector 250 (this is the device which actually compares the recorded output with the control target).

The purpose of the control system is to keep the process output 260 close to the control target 200 in spite of disturbances. This is achieved by the feedback 240 loop, which works as follows. Assume that the system is in equilibrium and that a disturbance occurs so that the process output 260 becomes larger than the control target 200. The error 270 is then negative and the control variable 210 decreases which in turn causes the process output 260 to decrease. This type of feedback 240 is called negative feedback, because the control variable 210 (or manipulated variable) moves in direction opposite to the process output 260.

The controller 230 has several parameters that can be adjusted. The control loop performs well if the parameters are chosen properly. It performs poorly otherwise, e.g., the system may become unstable.

Some embodiments of the invention implement integral control. The main function of an integral or summation control is to make sure that the process output 260 agrees with the target 200 in steady-state. With integral action, a small positive error 270 (e) will always lead to an increasing control signal, and a negative error 270 will give a decreasing control signal no matter how small the error is. Integral control gives a control action that is proportional to the time integral of the error 270. This ensures that the steady-state error 270 becomes zero. The integral action is given by $$I(t) = \frac{\gamma}{T_1} \int_0^t e(\tau) d\tau,$$

where $\gamma$ is a gain constant and $T_i$ is the integral time. It follows that $$\frac{dI}{dt} = \frac{\gamma}{T_1} e.$$

Approximating the derivative by the backward difference gives $$\frac{I(k\Delta t) - I((k-1)\Delta t)}{\Delta t} = \frac{\gamma}{T_1} e(k\Delta t), k = 0, 1, 2, \ldots,$$

where $\Delta t$ is the sampling period. This leads to the following recursive equation for the integral action $$I(k\Delta t) - I((k-1)\Delta t) + \frac{\gamma \Delta t}{T_1} e(k\Delta t) = I((k-1)\Delta t) + \alpha e(k\Delta t)$$

or $$I(n)=I(n-1)+\alpha\ e(n)$$

where $n=0,1,2,\ldots$, is a discrete time index.

Due to the burstiness of the network traffic and other perturbations, this error signal may be highly fluctuating, so that some low pass filtering may be desirable. Thus, the first part of the controller 230 may be a discrete-time first-order low-pass filter with gain $0<\beta<1$. The filtered error signal is given by $$\hat{e}_i(n)=(1-\beta)\hat{e}_i(n-1)+\beta e_i(n), i=1,2,\ldots,K.$$

In some embodiments, the second part of the controller is then the incremental adaptation of the network device's advertised window $W_i$ proportional to the filtered error signal $$W_i(n)=W_i(n-1)+\alpha\hat{e}_i(n), i=1,2,\ldots,K,$$

where $\alpha$ is a control gain.

For network traffic control with a wide range of operating conditions, it may happen that there is a persistent control error 270 (or mismatch) between the control target 200 (T) and the observed system state (q) 260. This persistent error 270 may be due to rate constraints at certain network nodes. For example, the errors 270 may be due to rate constrained traffic source(s), rate constraints due to downstream bottlenecks, or rate reduction due to upstream and/or downstream packet losses. If a controller 230 with integral action is used, the error 270 will continue to be integrated. This means the integral term (and as a result the control variable 210) may become very large or it "winds up". It is then required that the error 270 has opposite sign for a long period before things return to normal.

One way to avoid integrator windup is to introduce limiters or integrator anti-windup on the variables that can windup. The effect of anti-windup is to reduce both the overshoot and the control effort in the feedback control system as represented in FIG. 2. Implementatation of such anti-windup schemes is preferable in any practical implementation of integral control. Omission of this technique may lead to deterioration of response and even stability. FIG. 3 shows how a saturation 300 can limit the control variable directly providing anti-windup. However, too hard a limitation will cause an unnecessary limitation of the control action, and too weak a limitation will cause windup. So the limits must be selected carefully. The upper bound $W_{max}$ can be set to a maximum end system advertised window such as the 16-bit window size TCP protocol field (65536 bytes) or any suitable value.

Thus, the control equation becomes $$W_i(n)=[W_i(n-1)+\alpha \hat{e}_i(n)]_{W_{min}}^{W_{max}}$$

where the minimum window size is $W_{min} \geq 0$.

Figure 4:
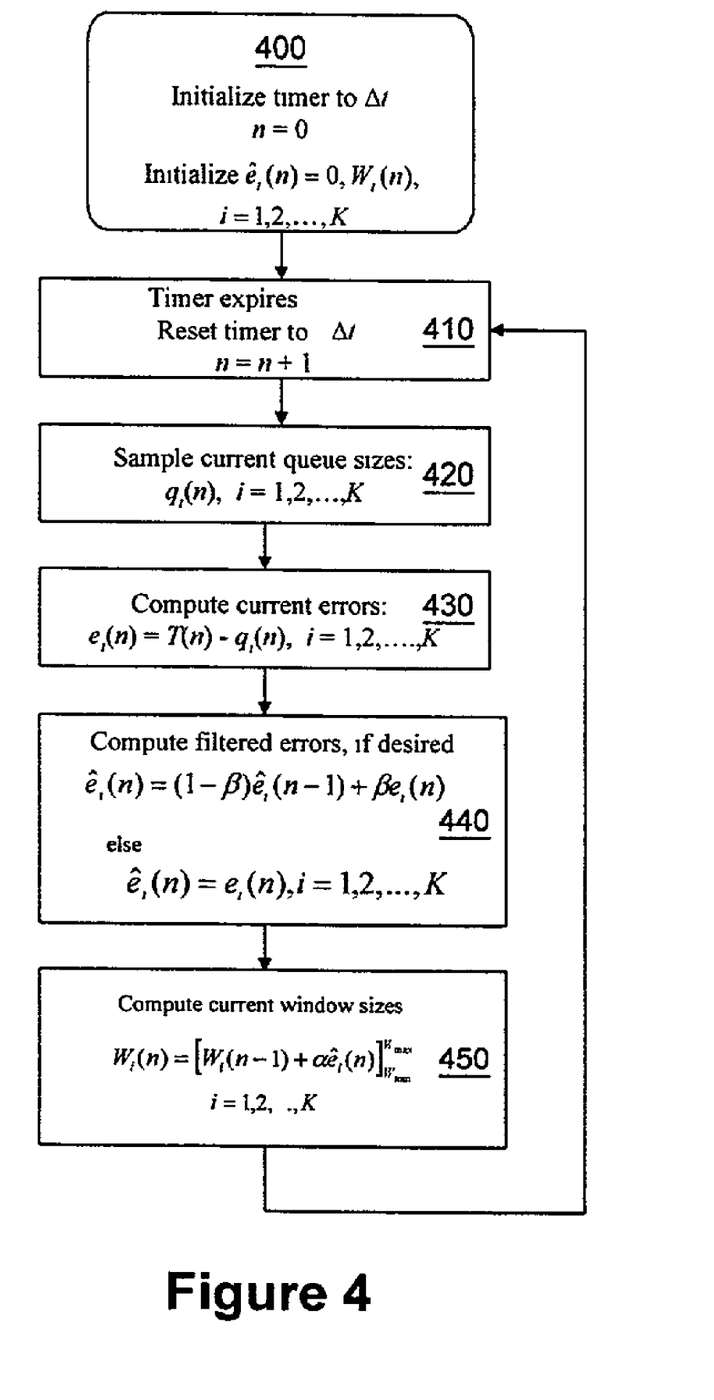
FIG. 4 is a flow diagram for a method of computing a network device's advertised window size for the connections in each service class according to one embodiment of the invention.
Figure 5:
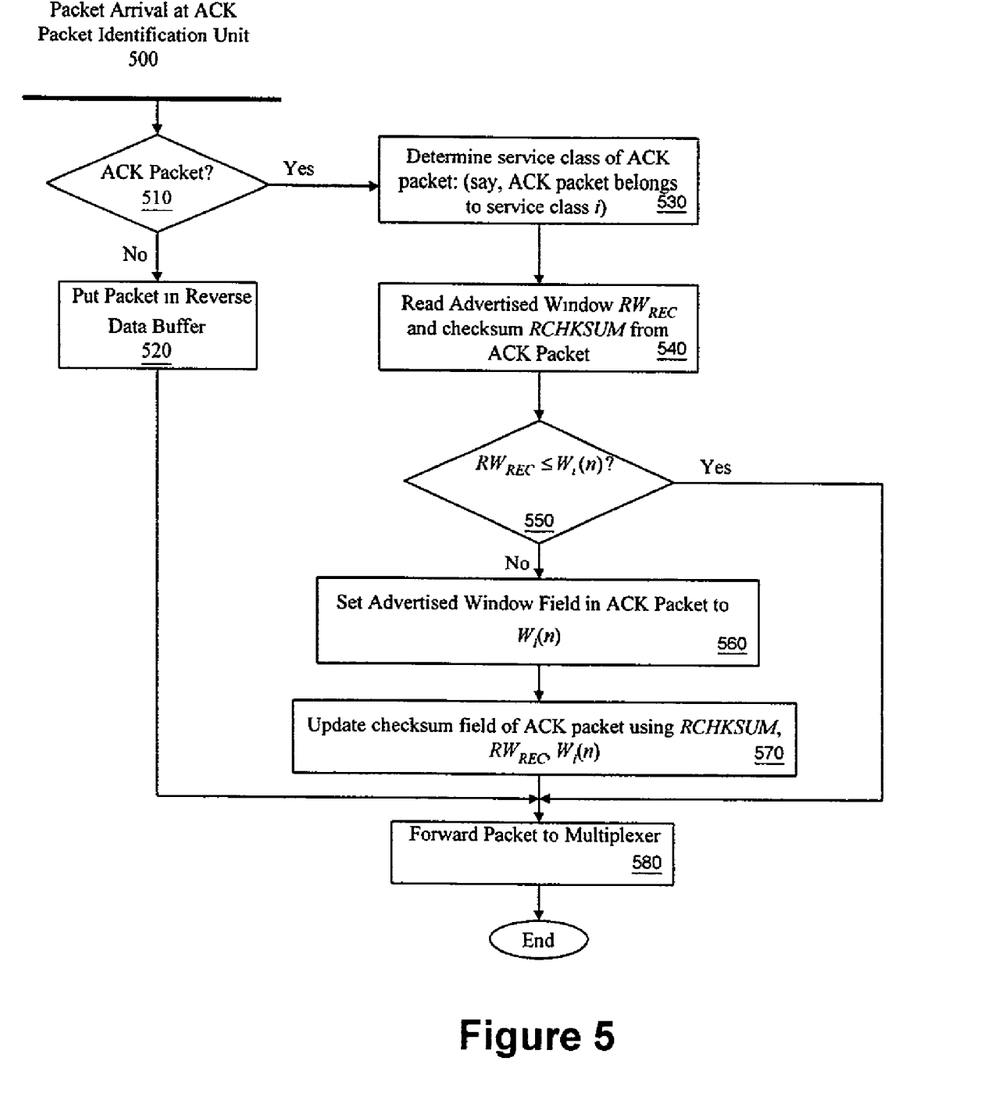
FIG. 5 is a flow diagram for a method of updating a TCP receiver's advertised window field according to one embodiment of the invention.

Flowcharts illustrating embodiments of the window computations and the TCP advertised window update at a network node are presented in FIG. 4, and FIG. 5, respectively. As shown in FIG. 4, one embodiment of the invention may compute a network device's advertised window size in the following manner. At step 400 initial parameters may be set. For example, the time interval for taking measurements $\Delta t$, the filtered error signal $\hat{e}_i(n)$, and the advertised window size $W_i(n)$, may be set to initial values (e.g., $\hat{e}_i(n)=0$, $n=0$, etc.). At step 410, upon expiration of an interval $\Delta t$, the timer may be reset to $\Delta t$, and n may be iterated to $n=n+1$. At step 420 a current queue size $q_i(n)$ may be sampled. At step 430 a current error may be computed (e.g., $e_i(n)=T(n)-q_i(n)$). In some embodiments, an optional step 440 may be implemented to compute a filtered error (e.g., $\hat{e}_i(n)(1-\beta)\hat{e}_i(n-1)+\beta e_i(n)$). In some embodiments, if a filtered error is not calculated, then the current computed error $\hat{e}_i(n)=e_i(n)$ is used. At step 450, the current window sizes may be computed (e.g., $W_i(n)=[W_i(n-1)+\alpha \hat{e}_i(n)]_{W_{min}}^{W_{max}}$). In some embodiments, the process may loop back to step 410 for another iteration.

FIG. 5 shows TCP receiver's advertised window field update according to one embodiment of the invention. The process may initiate at step 500 with the arrival of a data packet at an ACK packet identification unit (e.g., ACK packet identifier 20). At step 510 the process determines whether the data packet is an ACK packet. If it is determined that the packet is not a ACK packet, at step 520 the packet is placed in a reverse data buffer (e.g., reverse data buffer 28) and ultimately forwarded to a multiplexer (e.g., Mux 30) at step 580. If the packet is determined to be an ACK packet, a determination of the ACK packet class is made at step 530 (e.g., by packet classifier 22). At step 540 the TCP receiver's advertised window (e.g., $RW_{REC}$) and checksum (RCHKSUM) are read from the ACK packet (e.g., by window and checksum update module 24). Step 550 is to determine the read TCP receiver's advertised window size against the network device's advertised window size (e.g., $RW_{REC} \leq W_i(n)$?). If the read TCP receiver's advertised window $RW_{REC}$ is less than the network device's advertised window size $W_i(n)$, then the ACK packet is forwarded to a multiplexer (e.g., Mux 30) at step 580. If the read TCP receiver's advertised window $RW_{REC}$ is greater than the network device's advertised window size $W_i(n)$, then the ACK packet's TCP receiver's advertised window size is set to equal $W_i(n)$ at step 560. At step 570 the checksum field of the ACK packet is updated (e.g., by window and checksum update module 24) using RCHKSUM, $RW_{REC}$, and $W_i(n)$. The updated ACK packet is forwarded to a multiplexer (e.g., Mux 30) at step 580.

In some embodiments of TCP rate control, the TCP implementations in the end systems do not need to be modified, nor is it required to modifying the TCP protocol itself. Updating the window size in returning ACKs is done in a manner transparent to TCP. The processing performed by the network device on each TCP acknowledgment consists of updating the TCP receiver's advertised window and the checksum fields. The checksum can be updated from knowing only the previous and the new values of the advertised window field, as well as the old checksum value. For example, an efficient technique for incrementally updating the checksum is given in A. Rijsinghani, "Computation of the Internal Checksum via Incremental Update," IETF RFC 1624, May 1994.

Listed below are the parameters that may affect the control performance.

(1) Sampling intervals ($\Delta t$ and $\Delta s$): $\Delta t$ and $\Delta s$ are the time intervals for taking measurements and applying the computed $W_i$, $i=1,2,\ldots, K$ and T controls, respectively, (e.g., $\Delta t=10$ packet transmission time and $\Delta s=100$ msec).

(2) Control gain ($\alpha$): This controls the reaction speed and stability of the control system.

(3) Filter gain ($\beta$): This controls the reaction speed of the filter. The recommended value for some embodiments is $\beta=0.002$.

(4) Control target (i.e., computed common buffer threshold, T). This sets the average buffer utilization level and average queuing delay for each service class, since the average queue size evolves around this value.

(5) Buffer size (B). This is the buffer size allocated to the connections or flows anticipated in the system and is an issue related to buffer dimensioning and traffic engineering. B influences packet losses and system utilization level and is typically selected to be at least equal to a bandwidth-delay product worth of data.

Figure 6:
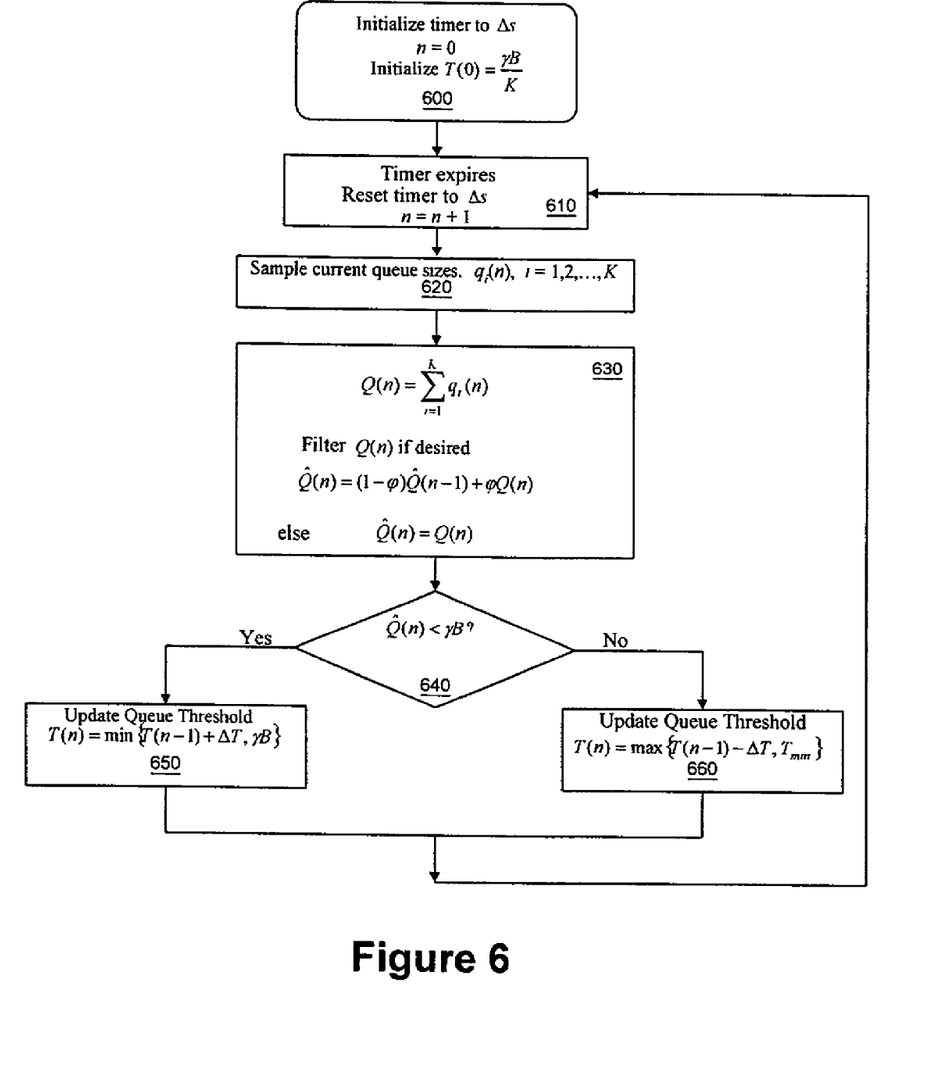
FIG. 6 is a flow diagram for a method of computing a dynamic threshold according to one embodiment of the invention.

Let $q_i(n)$ denote the queue size of class i at discrete time n, $i=1,2,\ldots, K$. The queue size $q_i(n)$ may fluctuate as the incoming traffic load and/or the service bandwidth allocated at class i vary with time. To ensure fair sharing of the buffer space B, some embodiments adopt the policy that each class should be able to access at least B/K buffers (i.e., the fair share) when it is overloaded. On the other hand, to efficiently utilize the buffer, (i.e., to achieve maximum buffer sharing) an overloaded class must be able to use any available buffer memory when such buffers are not used by other classes. Thus, we use a common threshold T(n) for all K service classes. One embodiment of a method for computing dynamic thresholds is shown in FIG. 6 where, at discrete time instances, the threshold computations are as follows:

(1) Initialization:

$$T(0) \leftarrow \frac{\gamma B}{K}$$

(2) After every interval of $\Delta s$ time units (in seconds), compute:

$$T(n) \leftarrow \begin{cases} \min\{T(n-1)+\Delta T, \gamma B\}, \text{ if } \sum_{i=1}^{K} q_i(n) < \gamma B \\ \max\{T(n-1)-\Delta T, T_{\min}\}, \text{ if } \sum_{i=1}^{K} q_1(n) \geq \gamma B. \end{cases}$$

The parameter $T_{min} \geq 0$ represents the minimum buffer threshold statically set for each service class. This is a user-configurable per-class quota to allow the network manager to assign the minimum number of buffers that each class can consume, thus preventing starvation of buffer resources. Through this, the dynamic buffering scheme allows the system to adapt intelligently to various traffic conditions and gives the network manager the ability to fine tune the network to different traffic characteristics. The step size $\Delta T>0$ controls the rate at which the buffer threshold changes. The buffer space $(1-\gamma)B$ is the slack buffer capacity used to absorb incoming traffic bursts. Thus, the parameter $\gamma \in (0,1]$ controls the extent to which the buffer space B is completely or partially shared: $\gamma=1$ results in complete sharing and $0<\gamma<1$ in partial sharing. If all classes are active, the slack buffer capacity per class is $(1-\gamma)B/K$.

In steady-state, the common threshold T is given by $T=\gamma B/N_\alpha$, where $1 \leq N_\alpha \leq K$ is the effective number of active classes in the system. In other words, the effective number of active classes at a given time instant is given by $N_\alpha=\gamma B/T$.

One embodiment of the computation of the dynamic buffer thresholds is illustrated in FIG. 6.

Figure 7:
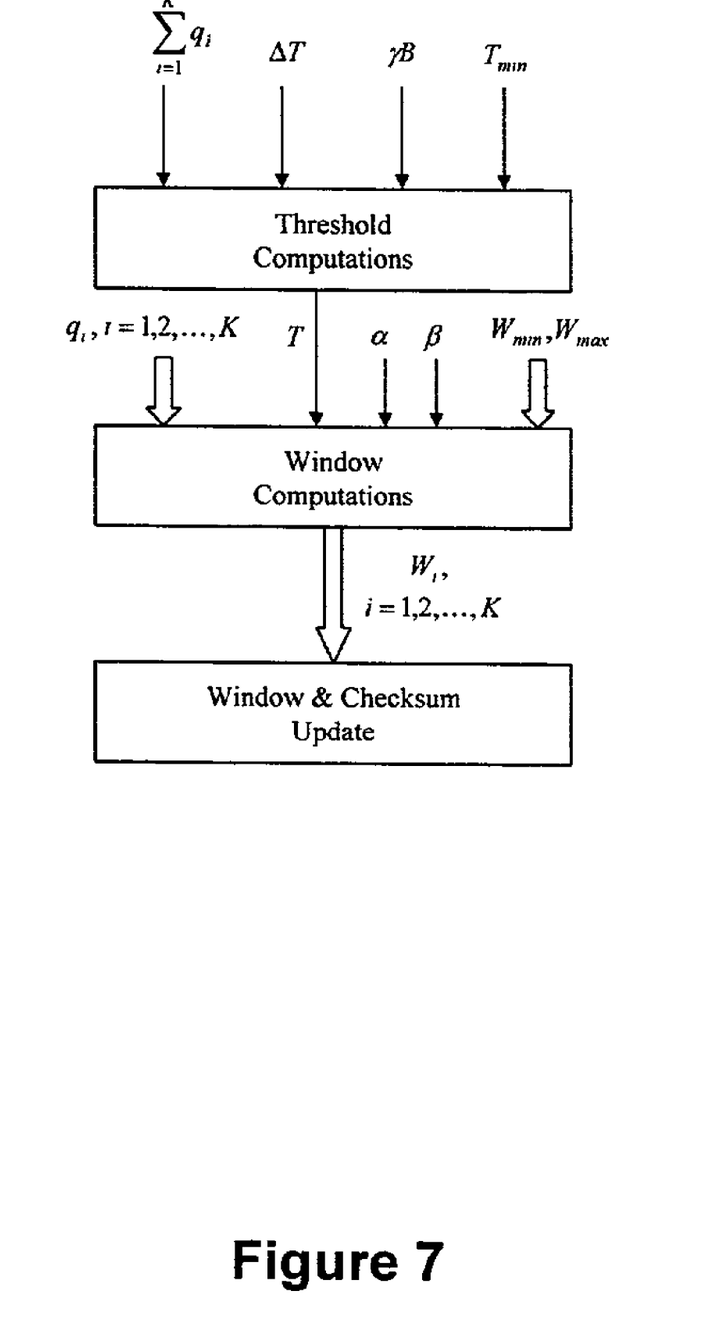
FIG. 7 is a schematic diagram of an overall TCP rate control scheme according to one embodiment of the invention.

A high-level description of the overall TCP rate control scheme taking into consideration all of the above discussions is given in FIG. 7.

As shown in FIG. 6, one embodiment of a method for dynamic threshold computation may initiate at step 600 by setting initial parameter values $$\left(\text{e.g., set timer to }\Delta s,\text{ initialize }T(0)=\frac{\gamma B}{K}\right).$$

At step 610, upon expiration of an interval $\Delta s$, the timer may be reset to $\Delta s$ and n may be iterated to n=n+1. At step 620, the current queue size $q_i(n)$ (e.g., queues 12, 14, 16) may be sampled. At step 630 a sum of sampled queue sizes may be calculated $$\left(\text{e.g., }Q(n)=\sum_{i=1}^{K}q_1(n)\right).$$

Some embodiments of the invention may optionally filter the sum of queue sizes to reduce fluctuations as described above (e.g., $\hat{Q}(n)=(1-\phi)\hat{Q}(n-1)+\phi Q(n)$). If the sum of queue sizes is not filtered then $\hat{Q}(n)$ is set equal to Q(n). At step 640 a comparison of the sum of queue sizes to the size of the shared buffer space is made (e.g., $\hat{Q}(n)<\gamma B$). If the queue size sum $\hat{Q}(n)$ is less than the shared buffer space $\gamma B$, then, at step 650, the queue threshold is updated to a minimum value (e.g., $T(n)=\min\{T(n-1)+\Delta T,\gamma B\}$). If the queue size sum $\hat{Q}(n)$ is greater than the shared buffer space $\gamma B$, then the queue threshold is updated to a maximum value (e.g., $T(n)=\max\{T(n-1)-\Delta T,T_{min}\}$). In some embodiments the process may return to step 610 for another iteration.

Effective control of TCP connections sharing a common bottleneck link, can be achieved by modifying at the bottleneck link, the receiver's advertised window in TCP acknowledgments returning to the senders. This is because the dynamics of TCP, specifically, a mismatch between the TCP window and the bandwidth-delay product of the network can cause the network switches or routers to accumulate large queues, resulting in buffer overflows, reduced throughput, unfairness and underutilization. As described above a TCP rate control scheme may be used for a shared-buffer with multiple queues where dynamic thresholds are used to ensure efficient and fair usage of buffer memory. The window control algorithm modifies the receiver's advertised window of an incoming ACK packet so that the queue occupancy level is kept at a given target level, thereby eliminating buffer underflow and overflow as much as possible.

The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the following appended claims. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. Accordingly, the claims set forth below should be construed in view of the full breath and spirit of the present invention as disclosed herein.

What is claimed is:

1. A method for controlling the transmission of data packets through a network by controlling a Transmission Control Protocol (TCP) rate in a network device having a shared buffer with shared buffer space, the method comprising:
   organizing a forward data buffer into one or more queues that store at least one forward data packet;
   calculating the network device's advertised window size by:
   (1) initializing a timer to a predetermined time interval $\Delta t$, and an iteration counter to a predetermined initial value n;
   (2) sampling a current queue size $q_i(n)$ during the predetermined time interval $\Delta t$;
   (3) calculating a current error signal $e_i(n)$ based, at least in part, upon the current queue size $q_i(n)$;
   (4) calculating the network device's advertised window size $W_i(n)$, based, at least in part, upon the current error signal $e_i(n)$ according to the equation: $W_i(n)=[W_i(n-1)+\alpha e_i(n)]_{W_{min}}^{W_{max}}$, where $\alpha$, $W_{max}$, and $W_{min}$, are predetermined parameters;
   (5) resetting the timer, upon expiration of the predetermined interval $\Delta t$; and
   (6) iterating the iteration counter, upon expiration of the predetermined time interval $\Delta t$;
   providing the network device's advertised window size to a TCP source; and
   calculating a dynamic buffer threshold based, at least in part, upon the sum of the queue sizes and the shared buffer space.

2. The method of claim 1 wherein the step of organizing a forward data buffer further comprises:
   organizing the forward data buffer into one or more queues with one queue per service class.

3. The method of claim 1 wherein the at least one forward data packet is stored according to its service class.

4. The method of claim 1 wherein the steps of calculating a current error signal $e_i(n)$ and calculating the network device's advertised window size further comprise:
   filtering the current error signal $e_i(n)$ according to the relation: $\hat{e}_i(n)=(1-\beta)\hat{e}_i(n-1)+\beta e_i(n)$, where $\beta$ is a predetermined parameter; and
   calculating the network device's advertised window size $W_i(n)$, based, at least in part, upon the filtered current error signal $\hat{e}_i(n)$ according to the equation: $W_i(n)=[W_i(n-1)+\alpha\hat{e}_i(n)]_{W_{min}}^{W_{max}}$, where $\alpha$, $W_{max}$, and $W_{min}$, are predetermined parameters.

5. The method of claim 1 wherein the step of providing the network device's advertised window size to a TCP source further comprises:

carrying information relating to the network device's advertised window size by returning TCP acknowledgements in a receiver's advertised window field.

6. The method of claim 1 wherein the step of providing the network device's advertised window size to a TCP source further comprises:
  updating a TCP receiver's advertised window size.

7. The method of claim 6 wherein the step of updating a TCP receiver's advertised window size further comprises:
  identifying whether a packet is an ACK packet, and, if not, putting the non-ACK packet in a reverse data buffer;
  determining a service class for the identified ACK packet;
  reading the TCP receiver's advertised window size ($RW_{rec}$) and a checksum (RCHKSUM) from the identified ACK packet;
  determining whether the TCP receiver's advertised window size $RW_{REC}$, is less than or equal to the calculated network device's advertised window size $W_i(n)$ and, if not setting a advertised window field in the identified ACK packet equal to the network device's advertised window size $W_i(n)$ and updating the checksum field for the identified ACK packet.

8. The method of claim 1 wherein the step of calculating a dynamic buffer threshold further comprises:
  initializing a timer to a predetermined time interval $\Delta s$ and an iteration counter to a predetermined initial value n;
  setting an initial dynamic buffer threshold T(0) equal to a gain constant $\gamma$ multiplied by a buffer size B and divided by a number of service classes K;
  sampling a current queue size $q_i(n)$ during the predetermined time interval $\Delta s$;
  calculating a sum of the sampled current queue size according to the equation:

$$Q(n) = \sum_{i=1}^{K} q_i(n);$$

determining whether the sum of the sampled current queue size is less than the product of the gain constant and the buffer size $\gamma B$;
    if so, updating the dynamic buffer threshold according to $\min\{T(n-1)+\Delta T, \gamma B\}$, where $\Delta T$ is a step size that controls the rate at which the dynamic buffer threshold changes;
    if not, updating the dynamic buffer threshold according to $\max\{T(n-1)-\Delta T, T_{min}\}$, where $T_{min}$ is a predetermined minimum size for the dynamic buffer threshold;
  resetting the timer, upon expiration of the predetermined interval $\Delta s$; and
  iterating the iteration counter, upon expiration of the predetermined time interval $\Delta s$.

9. The method of claim 8 wherein the step of calculating a sum of the sampled current queue size further comprises:
  filtering the sum of the sampled current queue size Q(n) according to the relation: $\hat{Q}(n)=(1-\phi)\hat{Q}(n-1)+\phi Q(n)$, wherein $\phi$ is a predetermined parameter.

10. An apparatus for controlling the transmission of data packets through a network by controlling a Transmission Control Protocol (TCP) rate in a network device having a shared buffer with shared buffer space, the apparatus comprising:
  a forward data buffer, organized into one or more queues that store at least one forward data packet;
  a network device's advertised window size calculation module further comprising:
    (1) a timer, initially set to a predetermined time interval $\Delta t$, and an iteration counter initially set to a predetermined initial value n;
    (2) a current queue size sampler that samples a current queue size $q_i(n)$ during the predetermined time interval $\Delta t$;
    (3) a current error signal calculation module that calculates a current error signal $e_i(n)$ based, at least in part, upon the current queue size $q_i(n)$; and
    (4) a window size calculation module that calculates the network device's advertised window size $W_i(n)$, based, at least in part, upon the current error signal $e_i(n)$ according to the equation: $W_i(n)=[W_i(n-1)+\alpha e_i(n)]_{W_{min}}^{W_{max}}$, where $\alpha$, $W_{max}$, and $W_{min}$, are predetermined parameters;
  a feed back module that provides the network device's advertised window size to a TCP source; and
  a dynamic buffer threshold module that calculates a dynamic buffer threshold based, at least in part, upon the sum of the queue sizes and the shared buffer space.

11. The apparatus of claim 10 wherein the current error signal calculation module further comprises:
  a filter module that filters the current error signal $e_i(n)$ according to the relation: $\hat{e}_i(n)=(1-\beta)\hat{e}_i(n-1)+\beta e_i(n)$, where $\beta$ is a predetermined parameter; and
  wherein the window size calculation module calculates the network device's advertised window size $W_i(n)$, based, at least in part, upon the filtered current error signal $\hat{e}_i(n)$ according to the equation: $W_i(n)=[W_i(n-1)+\alpha \hat{e}_i(n)]_{W_{min}}^{W_{max}}$, where $\alpha$, $W_{max}$, and $W_{min}$, are predetermined parameters.

12. The apparatus of claim 10 wherein the feed back module further comprises:
  an advertised window size updating module that updates a TCP receiver's advertised window size.

13. The apparatus of claim 12 wherein the advertised window size updating module further comprises:
  an ACK packet identification module that identifies whether a packet is an ACK packet, and, if not, puts the non-ACK packet in a reverse data buffer;
  an ACK packet classifier that determines a service class for the identified ACK packet;
  an advertised window size reader that reads a TCP receiver's advertised window size ($RW_{rec}$) and a checksum (RCHKSUM) from the identified ACK packet;
  a window size comparison module that determines whether the TCP receiver's advertised window size $RW_{REC}$, is less than or equal to the calculated network device's advertised window size $W_i(n)$ and, if not sets an advertised window field in the identified ACK packet equal to the calculated network device's advertised window size $W_i(n)$ and updates the checksum field for the identified ACK packet.

14. The apparatus of claim 10 wherein the dynamic buffer threshold module further comprises:
  a timer initially set to a predetermined time interval $\Delta s$ and an iteration counter initially set to a predetermined initial value n;
  a current queue size sampler that samples a current queue size $q_i(n)$ during the predetermined time interval $\Delta s$;
  a current queue size calculation module that calculates a sum of the sampled current queue size according to the equation:

$$Q(n) = \sum_{i=1}^{K} q_i(n),$$

where K is a number of service classes;

a dynamic buffer threshold determiner that determines whether the sum of the sampled current queue size is less than the product of a gain constant γ and a buffer size B;

and an updating module that updates the dynamic buffer threshold if the sum of the sampled current queue size is less than the product of the gain constant γ and the buffer size B, according to min{T(n−1)+ΔT, γB}, where ΔT is a step size that controls the rate at which the dynamic buffer threshold changes and if the sum of the sampled current queue size is not less than the product of a gain constant γ and a buffer size B, updates the dynamic buffer threshold according to max{T(n−1)−ΔT, $T_{min}$}, where $T_{min}$ is a predetermined minimum size for the dynamic buffer threshold.

15. The apparatus of claim 14 wherein the current queue size calculation module further comprises:

a filter that filters the sum of the sampled current queue size Q(n) according to the relation: $\hat{Q}(n)=(1-\phi)\hat{Q}(n-1)+\phi Q(n)$, wherein φ is a predetermined parameter.

16. An article of manufacture for controlling the transmission of data packets through a network by controlling a Transmission Control Protocol (TCP) rate in a network device having a shared buffer with shared buffer space, the article of manufacture comprising:

at least one processor readable carrier; and instructions carried on the at least one carrier;

wherein the instructions are configured to be readable from the at least one carrier by at least one processor and thereby cause the at least one processor to operate so as to:

organize a forward data buffer into one or more queues that store at least one forward data packet;

calculate a network device's advertised window size by:

(1) initializing a timer to a predetermined time interval Δt, and an iteration counter to a predetermined initial value n;

(2) sampling a current queue size $q_i(n)$ during the predetermined time interval Δt;

(3) calculating a current error signal $e_i(n)$ based, at least in part, upon the current queue size $q_i(n)$;

(4) calculating the network device's advertised window size $W_i(n)$, based, at least in part, upon the current error signal $e_i(n)$ according to the equation: $W_i(n)=[W_i(n-1)+\alpha e_i(n)]_{W_{min}}^{W_{max}}$, where α, $W_{max}$, and $W_{min}$, are predetermined parameters;

(5) resetting the timer, upon expiration of the predetermined interval Δt; and (6) iterating the iteration counter, upon expiration of the predetermined time interval Δt;

provide the network device's advertised window size to a TCP source; and calculate a dynamic buffer threshold based, at least in part, upon the sum of the queue sizes and the shared buffer space.

17. The article of manufacture of claim 16 wherein the instructions are configured to be readable from the at least one carrier by at least one processor and thereby cause the at least one processor to operate so as to:

organize the forward data buffer into one or more queues with one queue per service class.

18. The article of manufacture of claim 16 wherein the instructions are configured to be readable from the at least one carrier by at least one processor and thereby cause the at least one processor to operate so as to:

store the at least one forward data packet according to its service class.

19. The article of manufacture of claim 16 wherein the instructions are configured to be readable from the at least one carrier by at least one processor and thereby cause the at least one processor to operate so as to:

filter the current error signal $e_i(n)$ according to the relation: $\hat{e}_i(n)=(1-\beta)\hat{e}_i(n-1)+\beta e_i(n)$, where β is a predetermined parameter; and calculate the network device's advertised window size $W_i(n)$, based, at least in part, upon the filtered current error signal $\hat{e}_i(n)$ according to the equation: $W_i(n)=[W_i(n-1)+\alpha \hat{e}_i(n)]_{W_{min}}^{W_{max}}$, where α, $W_{max}$, and $W_{min}$, are predetermined parameters.

20. The article of manufacture of claim 16 wherein the instructions are configured to be readable from the at least one carrier by at least one processor and thereby cause the at least one processor to operate so as to:

carry information relating to the network device's advertised window size by returning TCP acknowledgements in a receiver's advertised window field.

21. The article of manufacture of claim 16 wherein the instructions are configured to be readable from the at least one carrier by at least one processor and thereby cause the at least one processor to operate so as to:

update a TCP receiver's advertised window size.

22. The article of manufacture of claim 21 wherein the instructions are configured to be readable from the at least one carrier by at least one processor and thereby cause the at least one processor to operate so as to:

identify whether a packet is an ACK packet, and, if not, put the non-ACK packet in a reverse data buffer;

determine a service class for the identified ACK packet;

read a TCP receiver's advertised window size ($RW_{rec}$) and a checksum (RCHKSUM) from the identified ACK packet;

determine whether the TCP receiver's advertised window size $RW_{REC}$, is less than or equal to the calculated network device's advertised window size $W_i(n)$ and, if not setting an advertised window field in the identified ACK packet equal to the calculated network device's advertised window size $W_i(n)$ and updating the checksum field for the identified ACK packet.

23. The article of manufacture of claim 16 wherein the instructions are configured to be readable from the at least one carrier by at least one processor and thereby cause the at least one processor to operate so as to:

initialize a timer to a predetermined time interval Δs and an iteration counter to a predetermined initial value n;

set an initial dynamic buffer threshold T(0) equal to a gain constant γ multiplied by a buffer size B and divided by a number of service classes K;

sample a current queue size $q_i(n)$ during the predetermined time interval Δs;

calculate a sum of the sampled current queue size according to the equation:

$$Q(n) = \sum_{i=1}^{K} q_i(n);$$

determine whether the sum of the sampled current queue size is less than the product of the gain constant and the buffer size $\gamma B$;

if so, updating the dynamic buffer threshold according to $\min\{T(n-1)+\Delta T, \gamma B\}$, where $\Delta T$ is a step size that controls the rate at which the dynamic buffer threshold changes;

if not, updating the dynamic buffer threshold according to $\max\{T(n-1)-\Delta T, T_{min}\}$, where $T_{min}$ is a predetermined minimum size for the dynamic buffer threshold;

reset the timer, upon expiration of the predetermined interval $\Delta s$; and iterate the iteration counter, upon expiration of the predetermined time interval $\Delta s$.

24. The article of manufacture of claim 23 wherein the instructions are configured to be readable from the at least one carrier by at least one processor and thereby cause the at least one processor to operate so as to:

filter the sum of the sampled current queue size $Q(n)$ according to the relation: $\hat{Q}(n)=(1-\phi)\hat{Q}(n-1)+\phi Q(n)$, wherein $\phi$ is a predetermined parameter.

* * * * *